United States Patent
Inbe et al.

(10) Patent No.: US 8,828,151 B2
(45) Date of Patent: *Sep. 9, 2014

(54) COMPOSITION FOR METAL SURFACE TREATMENT, METAL SURFACE TREATMENT METHOD AND METAL MATERIAL

(75) Inventors: Toshio Inbe, Tokyo (JP); Thomas Kolberg, Heppenheim (DE)

(73) Assignee: Chemetall GmbH, Frankfurt am Main (DE)

( * ) Notice: Subject to any disclaimer, the term of this patent is extended or adjusted under 35 U.S.C. 154(b) by 35 days.

This patent is subject to a terminal disclaimer.

(21) Appl. No.: 13/479,570

(22) Filed: May 24, 2012

(65) Prior Publication Data

US 2012/0261033 A1    Oct. 18, 2012

Related U.S. Application Data

(62) Division of application No. 12/224,628, filed as application No. PCT/JP2007/053832 on Feb. 28, 2007, now Pat. No. 8,262,809.

(30) Foreign Application Priority Data

Mar. 1, 2006 (JP) ................................. 2006-054861

(51) Int. Cl.
   *C23C 22/48* (2006.01)
   *C25D 9/00* (2006.01)

(52) U.S. Cl.
   USPC ........... 148/247; 148/276; 148/277; 148/284; 106/14.05; 106/14.11; 205/80; 205/124; 205/149; 205/220

(58) Field of Classification Search
   USPC ............... 148/247, 276–277, 284; 106/14.05, 106/14.11; 205/80, 124, 149, 220
   See application file for complete search history.

(56) References Cited

U.S. PATENT DOCUMENTS

| | | | |
|---|---|---|---|
| 4,339,310 A | 7/1982 | Oda et al. | 205/199 |
| 5,759,244 A | 6/1998 | Tomlinson | 106/14.14 |
| 6,485,580 B1 | 11/2002 | Nakada et al. | |
| 7,510,612 B2 | 3/2009 | Matsukawa et al. | |
| 7,811,366 B2 * | 10/2010 | Inbe et al. | 106/14.15 |
| 8,430,972 B2 * | 4/2013 | Inbe et al. | 148/247 |
| 8,436,093 B2 * | 5/2013 | Inbe et al. | 524/588 |
| 2001/0037748 A1 | 11/2001 | Shimakura et al. | 106/14.44 |
| 2001/0042491 A1 | 11/2001 | Shimakura et al. | |
| 2004/0163736 A1* | 8/2004 | Matsukawa et al. | 148/247 |
| 2005/0022907 A1 | 2/2005 | Claffey et al. | 148/247 |

FOREIGN PATENT DOCUMENTS

| | | |
|---|---|---|
| CN | 1381532 | 11/2002 |
| CN | 1510167 | 7/2004 |
| EP | 0760401 | 3/1997 |
| EP | 1433877 | 6/2004 |
| EP | 1433878 | 6/2004 |
| EP | 1486585 | 12/2004 |
| JP | 57-158397 | 9/1982 |
| JP | 7-310189 | 11/1995 |
| JP | 10-204649 | 8/1998 |
| JP | 2003-183800 | 7/2003 |
| JP | 2003-253463 | 9/2003 |
| JP | 2004-2904 | 1/2004 |
| JP | 2004-218071 | 8/2004 |
| JP | 2004-218074 | 8/2004 |
| JP | 2004-218075 | 8/2004 |
| JP | 2005-325401 | 11/2005 |
| WO | 99/46422 | 9/1999 |
| WO | 2006/137663 | 12/2006 |

OTHER PUBLICATIONS

Supplemental European Search Report issued to EP Application No. 07737551.7, mailed Mar. 31, 2010.
Notice of Reasons for Rejection issued to Chinese Application No. 200780007450.1, mailed Mar. 12, 2010.

* cited by examiner

*Primary Examiner* — Lois Zheng
(74) *Attorney, Agent, or Firm* — Dilworth & Barrese, LLP.

(57) ABSTRACT

Disclosed is an easily handleable composition for metal surface treatment which enables to achieve foundation surface concealment, coating adhesion and corrosion resistance equal to or higher than those obtained by the conventional metal surface treatment compositions. This composition for metal surface treatment places no burden on the environment. Also disclosed are a method for treating the surface of a metal material wherein such a composition for metal surface treatment is used, and a metal material treated by such a metal surface treatment method. Specifically disclosed is a metal surface treatment composition used for a treatment of a metal surface, which composition contains a zirconium compound and/or titanium compound substantially not containing fluorine, and an inorganic acid and/or a salt thereof. This metal surface treatment composition has a pH of not less than 1.5 but not more than 6.5.

9 Claims, No Drawings

COMPOSITION FOR METAL SURFACE TREATMENT, METAL SURFACE TREATMENT METHOD AND METAL MATERIAL

TECHNICAL FIELD

The present invention relates to a metal surface treatment composition for use in metal surface treatment, a metal surface treatment method for treating the surface of a metal material using the surface treatment composition, and a metal material treated with the metal surface treatment method.

BACKGROUND ART

When an article to be processed is to be coated, it is commonly subjected to surface treatment from the viewpoint of ensuring the corrosion resistance and adhesiveness of a coating film. In particular, when a metal (metal material, metal structure) is to be coated, the metal surface is subjected to chemical conversion treatment (surface treatment) for chemically forming a chemical conversion coating film.

An example of the chemical conversion treatment is chromate conversion treatment with a chromate containing composition; however, adverse effects of chromium have been noted. In recent years, a zinc phosphate treatment agent (zinc phosphate treatment) has been widely used as a chromium-free treatment agent (surface treatment agent, chemical conversion treatment agent) (see, for example, Patent Document 1).

However, the zinc phosphate treatment agent is highly reactive due to the high content of metal ions and acids that it contains, hence this treatment agent exerts an unfavorable impact on both the cost and the workability during drainage treatment. In addition, metal surface treatment with the zinc phosphate treatment agent involves the generation and sedimentation of water-insoluble salts. Such precipitates are generally referred to as sludge, and the removal and disposal of sludge generates an additional undesirable cost. Furthermore, the use of phosphate ions is not preferable because they may affect the environment through eutrophication, and the treatment of phosphate ion effluent requires considerable labor. Moreover, metal surface treatment with the zinc phosphate treatment agent requires surface adjustment, which can prolong the total treatment process.

In addition to the zinc phosphate treatment agent and chromate conversion treatment agent, a chemical conversion treatment agent containing a zirconium compound is known (see, for example, Patent Document 2). The chemical conversion treatment agent, including a zirconium compound, contains less metal ions and acids, and hence is not as reactive. This offers a favorable cost advantage and improved workability during drainage treatment. Such a chemical conversion treatment agent is also superior to the above-described zinc phosphate treatment agent in regard to the inhibition of sludge generation.

Patent Document 1: Japanese Unexamined Patent Publication No H10-204649
Patent Document 2: Japanese Unexamined Patent Publication No. H7-310189

DISCLOSURE OF THE INVENTION

Problems to be Solved by the Invention

However, a chemical conversion treatment agent containing zirconium usually contains highly toxic fluorine compounds such as hydrofluoric acid, which must be handled with great care. Further, the waste liquid after carrying out a chemical conversion treatment using a metal surface treatment composition including a fluorine compound will invariably also include fluorine ions (fluoride ions) or complex fluoride ions, which are equally harmful as fluorine compounds. Accordingly, with the current concern about environmental preservation, it is desired to develop a metal surface treatment composition which, as far as possible, does not include fluorine compounds which have a high environmental load.

Further, because prior zirconium based chemical conversion treatment agents use zirconium fluoride as a zirconium compound, the surface of a chemical conversion coating film will have Zr—F bonds, which cannot be said to have good adhesiveness to a coating film. Because of this, in order to improve the adhesiveness to the coating film, currently experiments are being carried out such as the addition of polyamine compounds.

The present invention takes the above problems into account, and its objective is to provide a metal surface treatment composition which can provide the same base metal concealing properties, coating film adhesiveness, and corrosion resistance as the prior art, a metal surface treatment composition which does not impart a burden on the environment and which has easy handling, a metal surface treatment method carried out on the surface of a metal material using this metal surface treatment composition, and a metal material treated by this metal surface treatment method.

Means for Solving the Problems

The inventors of the present invention have carried out diligent research to solve the above-described problems. As a result, it was discovered that in a metal surface treatment composition containing a zirconium compound and/or titanium compound substantially not including fluorine, and an inorganic acid and/or salt thereof, by controlling the pH to from 1.5 to 6.5, the above problem can be solved, and thus the present invention was arrived at and completed. More specifically, the present invention provides the following.

The first aspect of the present invention is a metal surface treatment composition used for surface treatment of a metal, containing a zirconium compound and/or titanium compound substantially not including fluorine, and an inorganic acid or salt thereof, and having a pH from 1.5 to 6.5.

The second aspect of the present invention is the metal surface treatment composition according to the first aspect, wherein the zirconium compound and/or titanium compound is at least one selected from the group consisting of a nitrate, nitrite, sulphate, sulfite, acetate, and carbonate of zirconium and/or titanium.

The third aspect of the present invention is the metal surface treatment composition according to the first or second aspect, further containing a polyamine compound having a number average molecular weight from 150 to 500,000.

The fourth aspect of the present invention is the metal surface treatment composition according to the third aspect, wherein said polyamine compound includes from 0.1 mmol to 24 mmol of a primary and/or secondary amino group per 1 g of solid content.

The fifth aspect of the present invention is the metal surface treatment composition according to the third or fourth aspect, wherein said polyamine compound is a product produced by a reaction of a primary and/or secondary amino group-containing compound, and an amine activity reducing compound A having a functional group A which has reactivity with said primary and/or secondary amino group.

The sixth aspect of the present invention is the metal surface treatment composition according to one of the third to fifth aspects, wherein said polyamine compound is a product produced by interacting a primary and/or secondary amino group-containing compound, and an amine activity reducing compound B containing at least one functional group B which interacts with said primary and/or secondary amino group and reduces amine activity.

The seventh aspect of the present invention is the metal surface treatment composition according to any one of the first to sixth aspects, further containing a blocked isocyanate having a number average molecular weight from 150 to 500,000, and further having at least two blocked isocyanate groups per molecule.

The eighth aspect of the present invention is the metal surface treatment composition according to any of the first to seventh aspects, further containing an organosiloxane which is a polycondensate of an organosilane, has a number average molecular weight of 150 to 500,000 and has at least 2 amino groups per molecule; and/or an organosilane having at least 1 amino group per molecule.

The ninth aspect of the present invention is the metal surface treatment composition according to any of the first to eighth aspects, wherein a content of said zirconium compound and/or titanium compound in said metal surface treatment composition is from 10 ppm to 10,000 ppm with respect to the metal element.

The tenth aspect of the present invention is the metal surface treatment composition according to any one of the first to ninth aspects of the present invention further includes at least one metal element selected from the group consisting of magnesium, zinc, calcium, aluminum, gallium, indium, copper, iron, manganese, nickel, cobalt, cerium, strontium, rare earth elements, and silver.

The eleventh aspect of the present invention is the metal surface treatment composition according to any one of the first to tenth aspects of the present invention further includes at least one kind selected from the group consisting of non-ionic surfactants, anionic surfactants, cationic surfactants, and ampholytic surfactants.

The twelfth aspect of the present invention is a metal surface treatment method for treating the surface of a metal material, comprising: a treatment solution contact step of contacting a metal surface treatment solution, containing the metal surface treatment composition according to any one of the first to eleventh aspects of the present invention, with the metal material; and a water washing step of washing the metal material with water after the treatment solution contact step.

The thirteenth aspect of the present invention is the metal surface treatment method according to the twelfth aspect, wherein the metal material is simultaneously subjected to a degreasing treatment during the treatment solution contact step.

The fourteenth aspect of the present invention is the metal surface treatment method according to the twelfth or thirteenth aspect, wherein the metal material is electrolyzed as a cathode in the treatment solution contact step.

The fifteenth aspect of the present invention is the metal surface treatment method according to any one of the twelfth to fourteenth aspects, further comprising an acid contact step of contacting the metal material after the water washing step with an acidic aqueous solution containing at least one selected from the group consisting of cobalt, nickel, tin, copper, titanium, and zirconium.

The sixteenth aspect of the present invention is the metal surface treatment method according to any one of the twelfth to fifteenth aspects, further comprising a polymer-containing solution contact step of contacting the metal material after the water washing step with a polymer-containing solution containing at least one of a water-soluble polymer compound and a water-dispersible polymer compound.

The seventeenth aspect of the present invention is a metal material treated with the metal surface treatment method according to any one of the twelfth to sixteenth aspects of the present invention.

The eighteenth aspect of the present invention is a metal material according to the seventeenth aspect, having a surface treatment coating layer on an iron-based metal material surface, wherein said surface treatment coating layer contains at least 10 mg/m2 of zirconium element and/or titanium element, and a mass ratio of zirconium element and/or titanium element with respect to nitrogen element according to XPS analysis of said surface treatment coating layer is from 0.05 to 500.

The nineteenth aspect of the present invention is a metal material according to the seventeenth aspect, having a surface treatment coating layer on a zinc-based metal material surface, wherein said surface treatment coating layer contains at least 10 mg/m2 of zirconium element and/or titanium element, and a mass ratio of zirconium element and/or titanium element with respect to nitrogen element according to XPS analysis of said surface treatment coating layer is from 0.05 to 500.

The twentieth aspect of the present invention is a metal material according to the seventeenth aspect, having a surface treatment coating layer on an aluminum-based metal material surface, wherein said surface treatment coating layer contains at least 5 mg/m2 of zirconium element and/or titanium element, and a mass ratio of zirconium element and/or titanium element with respect to nitrogen element according to XPS analysis of said surface treatment coating layer is from 0.05 to 500.

The twenty first aspect of the present invention is a metal material according to the seventeenth aspect, having a surface treatment coating layer on a magnesium-based metal material surface, wherein said surface treatment coating layer contains at least 5 mg/m$^2$ of zirconium element and/or titanium element, and a mass ratio of zirconium element and/or titanium element with respect to nitrogen element according to XPS analysis of said surface treatment coating layer is from 0.05 to 500.

Effects of the Invention

According to the present invention, in a metal surface treatment composition containing a zirconium compound and/or titanium compound substantially not including fluorine, and an inorganic acid and/or salt thereof, by controlling the pH of the metal surface treatment composition to from 1.5 to 6.5, it is possible to provide a metal surface treatment composition which can form a chemical conversion coating film having the same base metal concealing properties, coating film adhesiveness, and corrosion resistance as the prior art, in addition to having easy handling without imparting a burden on the environment, a metal surface treatment method which carries out surface treatment of the metal material using this metal surface treatment composition, and a metal material treated by this metal surface treatment method.

PREFERRED MODE FOR CARRYING OUT THE INVENTION

Below, the metal surface treatment composition, metal surface treatment method, and metal material of the present embodiment are explained in detail.

Metal Surface Treatment Composition

A metal surface treatment composition according to the present embodiment is used for metal surface treatment, and includes a zirconium compound and/or titanium compound, and an inorganic acid and/or salt thereof.

Further, the metal surface treatment composition according to the present embodiment is diluted with water, and adjusted to make a metal surface treatment solution, which is used for metal surface treatment.

Zirconium Compound and/or Titanium Compound Component

Zirconium and/or titanium derived from the zirconium compound and/or titanium compound component contained in the metal surface treatment composition according to the present embodiment is a component for forming a chemical conversion coating film. The formation of a chemical conversion coating film including zirconium and/or titanium on a metal material allows the improvement of corrosion resistance and abrasion resistance of the metal material.

Hitherto, metal surface treatment compositions containing fluorine such as $K_2ZrF_6$, $(NH_4)_2ZrF_6$ and the like have been used, but the zirconium compound and/or titanium compound of the metal surface treatment composition according to the present embodiment is one substantially not including fluorine. The expression "substantially not including fluorine" refers to the case that the measured value of the fluorine element concentration using an ion chromatograph SERIES 2000i (manufactured by Dionex Corporation) is 10 ppm or less.

When a metal material is subjected to surface treatment with the metal surface treatment composition including a zirconium compound and/or titanium compound according to the present embodiment, the metal constituting the metal material causes dissolution. When a dissolution reaction of a metal occurs, due to an increase of the pH at the interface, hydroxides or oxides of zirconium and/or titanium are generated, and are thought to deposit on the surface of a metal material. Then, the adhesiveness of the chemical conversion coating film and the coating film formed on the surface of this chemical conversion coating film becomes good due to the presence of Zr—O bonds and/or Ti—O bonds derived from these hydroxides and/or oxides of zirconium and/or titanium.

Further, the zirconium compound and/or titanium compound of the metal surface treatment composition according to the present embodiment, unlike the prior art, is one substantially not including fluorine. Accordingly, on the surface of the chemical conversion coating film formed by the metal surface treatment composition, there are no Zr—F bonds and/or Ti—F bonds which inhibit the adhesiveness to the coating film on the surface of the chemical conversion coating film, and thus it is possible to maintain a good adhesiveness of the chemical conversion coating film and the coating film formed on its surface.

The zirconium compound is not particularly limited, and a nitrate, nitrite, sulfate, sulfite, chloride, bromide, oxide, hydroxide, peroxide, and carbonate of zirconium, and the like, can be mentioned. It is preferable that this zirconium compound is a compound which generates an acid, so that the pH in the metal surface treatment is from 1.5 to 6.5 as mentioned above, but even in the case that it does not generate an acid, an acid can be added as described below.

In the same way, the titanium compound is not particularly limited, and a nitrate, nitrite, sulfate, sulfite, chloride, bromide, oxide, hydroxide, peroxide, and carbonate of titanium, and the like, can be mentioned.

Content of Zirconium and/or Titanium

The content of zirconium and/or titanium in the metal surface treatment composition according to the present embodiment is preferably within the range from 10 ppm to 10000 ppm with respect to the metal element. If the content is less than 10 ppm, a sufficient amount of coating cannot be provided on a metal material, and if it is more than 10000 ppm, no further improvement is expected and cost efficiency decreases. This content is more preferably from 50 ppm to 1000 ppm with respect to the metal element.

Inorganic Acid and/or Salt Thereof

The inorganic acid and/or salt thereof included in the metal surface treatment composition according to the present embodiment it thought to promote the coating film formation reaction as an oxidant. As the inorganic acid, nitric acid, nitrous acid, sulfuric acid, sulfurous acid, persulfuric acid, phosphoric acid, hydrochloric acid, bromic acid, chloric acid, hydrogen peroxide, $HMnO_4$, $HVO_3$, $H_2WO_4$ and $H_2MoO_4$ and the like can be mentioned. Further, in the metal surface treatment Composition, as an oxidant, it is possible to include carboxylic acid group-containing compounds, sulphonic acid group-containing compounds, and/or salts thereof.

pH of the Metal Surface Treatment Composition

The pH of the metal surface treatment composition of the present embodiment is from 1.5 to 6.5. If the pH is less than 1.5, the etching is excessive, and it may be impossible to obtain sufficient coating film formation, the coating film may be non-uniform, which may have an adverse effect on the external appearance of the coating. On the other hand, if it exceeds 6.5, the etching will be insufficient and a good coating film cannot be obtained. The pH is preferably from 2 to 5, and more preferably in a range from 2.5 to 4.5.

Further, the pH of the metal surface treatment composition can be adjusted with acidic compounds such as nitric acid, sulfuric acid, and the like, and basic compounds such as sodium hydroxide, calcium hydroxide, ammonia, and the like.

Polyamine Compound, Blocked Isocyanate, Organosiloxane, and Organosilane

The metal surface treatment composition according to the present embodiment can contain at least one of a polyamine compound, a blocked isocyanate having at least 2 blocked isocyanate groups per molecule, an organosiloxane having at least 2 amino groups per molecule, and an organosilane having at lest one amino group per molecule. These contents act on both the surface of the metal material and the coating film formed after the surface treatment, and can improve the adhesiveness of both.

Polyamine Compound

The polyamine compound included in the metal surface treatment composition of the present embodiment is a polymer compound having a plurality of amino groups per molecule. As an example of the polyamine compound, the polyamine compound with the structure below can be mentioned. Namely, this polyamine compound is a compound having one kind of the constituent units shown by the following Formulas (1), (2), and (3) in at least one portion thereof.

$$-(CH_2-CH)- \quad (1)$$
$$\qquad\quad |$$
$$\qquad\quad NH_2$$

$$-(CH_2-CH)- \quad (2)$$
$$\qquad\quad |$$
$$\qquad\quad CH_2$$
$$\qquad\quad |$$
$$\qquad\quad NH_2$$

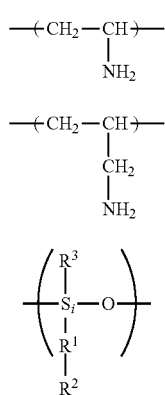
(3)

(In Formula (3), $R^1$ is an alkylene group with a carbon number of 1 to 6, $R^2$ is a substituent group shown by the following Formulas (4) to (6), $R^3$ is —OH, —$OR^4$, or —$R^5$ ($R^4$ and $R^5$ are alkyl groups with a carbon number of 1 to 6).)

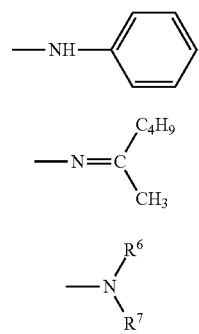

(In Formula (6), is a hydrogen atom, aminoalkyl group with a carbon number of 1 to 6, or an alkyl group with a carbon number of 1 to 6, $R^7$ is a hydrogen atom, or an aminoalkyl group with a carbon number of 1 to 6.)

It is particularly preferable if the polyamine compound is a polyvinylamine resin consisting only of the constituent units shown by the above Formula (1), a polyallylamine resin consisting only of the constituent units shown by the above Formula (2), and an organosiloxane consisting only of the constituent units shown by the above Formula (3). As one example of the organosiloxane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, polycondensates of hydrochlorides of N-(vinylbenzyl)-2-aminoethyl-3-aminopropyltrimethoxysilane, and the like can be mentioned. The above polyvinylamine resin, polyallylamine resin, and organosiloxane are particularly preferable in the point of having an excellent effect of improving the adhesiveness.

The above polyvinylamine resin is not particularly limited, and for example it is possible to use commercially available polyvinylamine resins such as PVAM-0595B (manufactured by Mitsubishi Chemical Corporation) and the like. The above polyallylamine resin is not particularly limited, and for example it is possible to use commercially available polyal- lylamine resins such as PAA-01, PAA-10C, PAA-H-10C, PAA-D-41HCl (all manufactured by NittoBoseki Co., Ltd.). The above polyaminosiloxane is not particularly limited, and it is possible to use commercially available polysiloxanes. Further, is it possible to use in combination two or more of the polyvinylamine resin, polyallylamine resin, and polysiloxane.

Molecular Weight of Polyamine Compound

The polyamine compound has a number average molecular weight in the range from 150 to 500,000. If less than 150, it is not possible to Obtain a chemical conversion coating film having sufficient coating film adhesiveness, which is not preferable. If over 500,000, there is concern that coating film formation will be inhibited. The above lower limit is more preferably 5,000, and the above upper limit is more preferably 70,000.

Amino Group Content of Polyamine Compound

It is preferable for the polyamine compound according to the present embodiment to have from 0.1 mol to 24 mmol of primary and/or secondary amino groups per 1 g of the solid content. If less than 0.1 mmol, adhesiveness to the subsequently formed coating film is not obtained, and if more than 24 mmol, the excess amino groups will exert adverse effects, and as a result of the generation of blisters, the base metal concealing properties, along with the adhesiveness and the corrosion resistance will be degraded. The above polyamine compound preferably contains from 0.1 mmol to 17 mmol of primary and/or secondary amino groups per 1 g of solid content, and most preferably contains from 1 mmol to 3 mmol of primary and/or secondary amino groups per 1 g of solid content.

Product A and/or Product B

The polyamine compound is preferably a product (referred to as product A) produced by reacting a primary and/or secondary amino group-containing compound and an amine activity reducing compound A having a functional group A having reactivity with the primary and/or secondary amino group. Further, the polyamine compound may also be a product (referred to as product B) produced by interaction of the a primary and/or secondary amino group-containing compound, and an amine activity reducing compound B including at least one functional group B which interacts with said primary and/or secondary amino group and which reduces amine activity. Further, the polyamine compound may be the product A and/or product B.

Functional Group A

The functional group A which has reactivity with the primary and/or secondary amino group is not particularly limited, and for example, glycidyl groups, isocyanate groups, aldehyde groups, and acid anhydride groups, and the like can be mentioned.

Functional Group B

The above functional group B is not particularly limited, and for example, carboxyl group, sulphonic group, phosphate group, silanol group, and phosphorous group can be mentioned.

As examples of a compound having at least one of the above functional group A and the above functional group B, 3-isocyanatepropyl-triethoxysilane, colloidal silica, epoxy resin, acetic anhydride, polyphosphoric acid and the like can be mentioned, but it is not limited to these examples. Further, it is possible to use as-is the commercially available KBE9007 (manufactured by Shin-Etsu Chemical Co., Ltd.), and XS1003 (manufactured by Chisso Corporation) and the like.

Reaction Ratio

The above product A is preferably produced by reacting from 1 mmol to 60 mmol of functional group A with respect to 100 mmol of the primary and/or secondary amino groups. If less than 1 mmol, the excess amino groups will exert an adverse effect, and as a result of the generation of blisters, the base metal concealing properties, along with the adhesiveness and the corrosion resistance will be degraded. If exceeding 60 mmol, the adhesiveness to the subsequently formed coating film cannot be obtained. The above product A is more preferably produced by reacting from 1 mmol to 30 mmol of functional group A with respect to 100 mmol of primary and/or secondary amino groups.

Interaction Ratio

Further, the above product B is preferably produced by interacting from 1 mmol to 60 mmol of functional group B with respect to 100 mmol of the primary and/or secondary amino group. If less than 1 mmol, the excess amino groups will exert an adverse effect, and as a result of the generation of blisters, the base metal concealing properties, along with the adhesiveness and the corrosion resistance will be degraded. If more than 60 mmol, it is not possible to obtain adhesiveness to the subsequently formed coating film. The above product B is more preferably produced by the interaction of from 1 mmol to 30 mmol of the functional group B with respect to 100 mmol of the primary and/or secondary amino group.

Organosiloxane

The organosiloxane which can be included in the metal surface treatment composition according to the present embodiment is a polycondensate of organosilane and has at least two amino groups per molecule. Examples of the organosilane include those represented by the following formula (7):

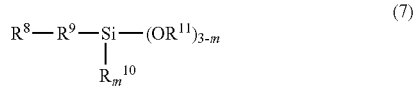
(7)

(In the formula, m is 0, 1, or 2; $R^8$ is —Cl, —SH, $S_4C_3H_6Si(OC_2H_5)_3$, —N=C=O, or a substituent group represented by the following Formulas (8) to (16), $R^9$ represents an alkylene group with a carbon number of one to six; $R^{10}$ represents —OH, —$OR^{12}$, or —$R^{13}$ ($R^{12}$ and $R^{13}$ each represent an alkyl group having a carbon number of one to six); and $R^{11}$ represents an alkyl group having a carbon number of one to three.)

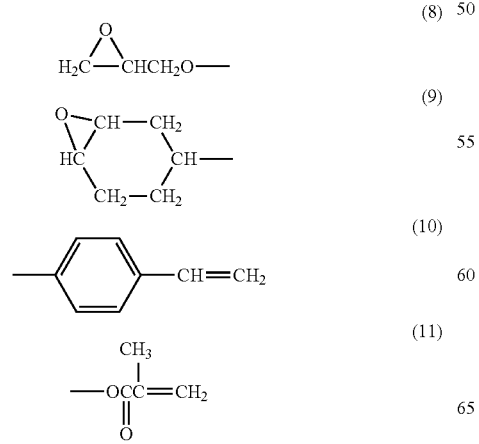

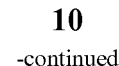
(12)

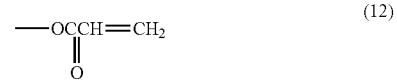
(13)

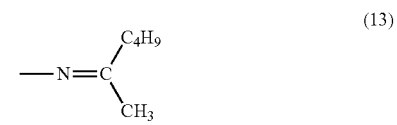
(14)

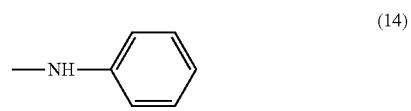
(15)

(16)

(In the formula, $R^{14}$ is a hydrogen atom, an aminoalkyl group having a carbon number of one to six, or an alkyl group having a carbon number of one to six, and $R^{15}$ represents a hydrogen atom or an aminoalkyl group having a carbon number of one to six.)

The organosilane of the above Formula (7) is preferably N-(2-aminoethyl)-3-aminopropyltrimethoxysilane where m=0, $R^8$ is —$NHC_2H_4NH_2$, $R^9$ is a propylene group, and $R^{11}$ is a methyl group, or a 3-aminopropyltriethoxysilane where m=0, $R^8$ is —$NH_2$, $R^9$ is a propylene group, and $R^{11}$ is a methyl group. As one example of an organosiloxane having at least 2 amino groups per molecule and which is a polycondensate of these organosilanes, the following Formulas (17) to (21) can be mentioned.

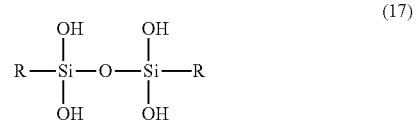
(17)

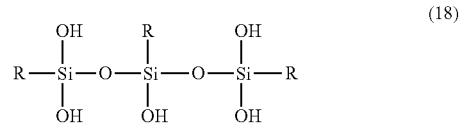
(18)

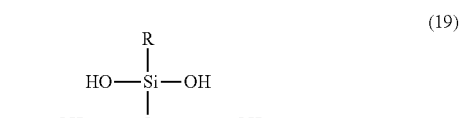
(19)

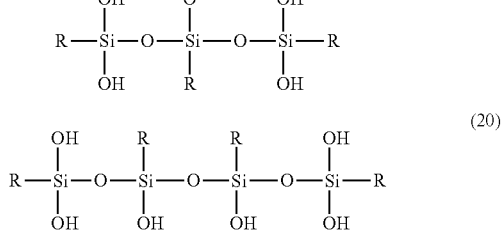
(20)

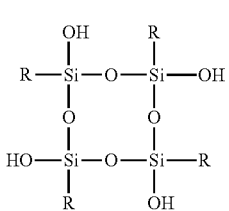

(21)

(In the formula, R represents —$C_3H_6NHC_2H_4NH_2$, or —$C_3H_6NH_2$.)

The organosiloxane which can be included in the metal surface treatment composition according to the present embodiment acts on both of the surface of metal material and the coating film formed after metal surface treatment, to improve the adhesiveness between them. It is assumed that the effect is produced as follows: the alkoxy group in the organosiloxane is hydrolyzed to generate a silanol, which acts on the surface of the metal material through hydrogen bonds; and amino groups of the organosiloxane act on the coating film through chemical bonds or hydrogen bonds, which improves the adhesiveness between the coating film and the metal material. More specifically, the organosiloxane contained in the chemical conversion coating film acts on both the metal material and coating film to improve the adhesiveness between them.

Further, in order to improve the adhesiveness, the organosiloxane is preferably a monocondensate of the organosilane shown in the above Formula (7), or a cocondensate of the organosilane shown in the above Formula (7). In order to further improve the adhesiveness, the organosilane shown in the above Formula (7) is preferably a cocondensate. In the case that the organosiloxane is a monocondensate of the organosilane shown in the above Formula (7), then from among the organosilanes shown in the above Formula (7), an organosiloxane of monocondensed organosilanes having amino groups is produced. Further, in the case that the organosiloxane is a cocondensate of the organosilane shown in the above Formula (7), then it is prepared so that an organosilane not having amino groups and an organosilane having amino groups are cocondensed, and it includes at least two amino groups per molecule. Polycondensates such as the above are balanced so as to have at least two amino groups per molecule. The at least two amino groups of the organosiloxane are have the characteristics of improving the adhesiveness to the coating film, and, because of the basicity of the amino groups, facilitating coprecipitation of the organosiloxane to deposit in the coating film during the formation of a chemical conversion coating film of zirconium or titanium. Accordingly, the film deposition and the adhesiveness can be improved with the metal surface treatment composition including an organosiloxane which is a monocondensate of the organosilane represented by the above general formula (7), or cocondensate of the organosilane represented by the above general formula (7).

The organosiloxane used in the present embodiment is a polycondensate of the organosilane represented by the above general formula (7) and has in a molecule thereof at least two amino groups. Therefore, once it is polymerized, it is considered not to be readily hydrolyzed to monomers by dilution. The reason that the organosiloxane is stable in an aqueous solution is considered that the binding energy of Si—O—Si in the organosiloxane is significantly higher than the binding energy of Si—O—C. Further, the reason that the organosiloxane having amino groups is stable in an aqueous solution is considered that silanol is neutralized by amino groups, and unpaired electrons on nitrogen atoms coordinate on silicon atoms to relieve polarization in silanol. Accordingly, the organosiloxane is relatively stable even if it is mixed in the metal surface treatment composition, and hence, it is effectively incorporated into a chemical conversion coating film to contribute to the improvement of the adhesiveness of the chemical conversion coating film.

As specific organosiloxanes, those which are cocondenstes of organosilane and having at least 2 amino groups per molecule, such as vinyltrichlorsilane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycycloxypropyltriethoxysilane, p-styryltrimethoxysilane, 3-metacryloxypropylmethyldimethoxysilane, 3-metacryloxypropyltrimethoxysilane, 3-metacryloxydipropylmethyldiethoxysilane, 3-metacryloxypropyltriethoxysilane, 3-acryloxypropyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochloride of N-(vinylbenzyl)-2-aminoethyl-3-aminoproypltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, and the like. As the organosilane which is the raw material of the organosiloxane, commercially available amino group-containing silane coupling agents, such as KBM-403, KBM-602, KBM-603, KBE-603, KBM-903, KBE-903, KBE-9103, and KBM-573 (all manufactured by Shin-Etsu Chemical Co., Ltd.), and XS1003 (manufactured by Chisso Corporation) and the like can be used.

Because there is a tendency for the hydroxides or oxides of the zirconium or titanium to be more readily incorporated as the number average molecular weight of the above organosiloxane becomes higher, it is preferably in the range from 150 to 500,000. If less than 150, it is not possible to obtain a chemical conversion coating film having sufficient coating film adhesiveness, which is not preferable. If over 500,000, there is concern that coating film formation will be inhibited. The above lower limit is more preferably 5,000, and the above upper limit is more preferably 70,000.

Organosilane

The metal surface treatment composition according to the present embodiment may further contain an organosilane having at least one amino group per molecule. In the same way as for the above organosiloxane, the organosilane having at least one amino group per molecule, because it has amino groups, is considered to improve the adhesiveness when incorporated into the chemical conversion coating film. Specifically, as an organosilane having at least one amino group per molecule, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochlorides of N-(vinylbenzyl)-2-aminoethyl-3-aminopropyltrimethoxysilane, and the like can be mentioned.

Blocked Isocyanate

The blocked isocyanate which can be included in the metal surface treatment composition according to the present embodiment is a polycondensate of a compound (monomer) having at least one blocked isocyanate group per molecule. For the blocked isocyanate group, with heating, the blocking group dissociates and generates isocyanate groups. A compound having at least one blocked isocyanate group per molecule can be obtained by the addition of a blocking group to a compound having at least one isocyanate group per molecule. The compound having at least one isocyanate group per molecule is not particularly limited, and for example, aliphatic diisocyanates such as hexamethylenediisocyanate (including trimer), tetramethylenediisocyanate, and trimethylhexamethylenediisocyante; alicyclic polyisocyanates such as isophoronediisocyanate, 4,4'-methylenebis(cyclohexylisocyanate) and the like, and aromatic diisocyanates such as 4,4'-diphenylmethanediisocyanate, tolylenediisocyanate and xylylenediisocyanate and the like can be mentioned.

Molecular Weight of Blocked Isocyanate

The blocked isocyanate has a number average molecular weight within the range from 150 to 500,000. If less than 150, it is not possible to obtain a chemical conversion coating film having sufficient coating film adhesiveness, which is not preferable. If over 500,000, there is concern that coating film formation will be inhibited. The above lower limit is more preferably 5,000, and the above upper limit is more preferably 70,000.

Surfactant

The metal surface treatment composition according to the present embodiment may further include at least one kind of surfactant selected from the group consisting of nonionic surfactants, anionic surfactants, cationic surfactants, and amphoteric surfactants. The nonionic surfactants, anionic surfactants, cationic surfactants, and amphoteric surfactants may be known ones. In the case where the metal surface treatment composition used in the present embodiment includes the above surfactants, a favorable film is formed with no necessity for degreasing and cleansing of the metal material in advance.

Metal Element

The metal surface treatment composition according to the present embodiment may include a metal element which is capable of imparting adhesiveness and corrosion resistance to the coating film. Examples of the metal element which may be contained in the metal surface treatment composition as a chemical conversion treatment agent include magnesium, zinc, calcium, aluminum, gallium, indium, copper, iron, manganese, nickel, cobalt, cerium, strontium, rare earth elements, and silver.

Metal Surface Treatment Method

The metal surface treatment method which carries out a surface treatment of a metal according to the present embodiment is not particularly limited, and can be carried out by contacting a metal surface treatment solution containing the metal surface treatment composition according to the present embodiment with a metal material. More specifically, the metal surface treatment method according to the present embodiment includes a treatment solution contact step of contacting a metal surface treatment solution containing the metal surface treatment composition with a metal material. Examples of the above metal surface treatment method include an immersion method, spray method, roll coat method, and flow coating.

Surface Treatment Conditions

The treatment temperature in the surface treatment is preferably within the range of 20° C. to 70° C. If the temperature is lower than 20° C., sufficient film formation may not be achieved, and inconveniences may occur, such as the necessity to control temperature during the summer season and if above 70° C., there is no particular effect, and it is economically disadvantageous. The treatment temperature is more preferably within the range from 30° C. to 50° C.

The treatment time for the surface treatment is preferably within the range from 5 seconds to 1100 seconds. If less than 5 seconds, a sufficient coating film amount cannot be obtained, which is undesirable, and there is no meaning for a time over 1100 seconds, because there is no effect from further increasing the coating film amount. This treatment time is more preferably within the range from 30 seconds to 120 seconds.

The metal surface treatment method according to the present embodiment, in contrast with the conventional chemical conversion treatment method with a zinc phosphate chemical conversion treatment agent, does not require surface adjustment treatment in advance. This allows chemical conversion treatment of a metal material with fewer processes.

Further, in the metal surface treatment method according to the present embodiment, a metal material may be electrolyzed as a cathode. In this case, hydrogen is reduced at the interface of the metal material as a cathode to increase the pH. With the increase of pH, stability of the compound containing the zirconium and/or titanium element decreases at the interface of the cathode, by which a surface treatment film deposits as an oxide or hydroxide containing water.

Metal Material

The metal material for use the metal surface treatment method according to the present embodiment is not particularly limited, and examples thereof include a steel sheet and aluminum plate. Steel sheet is not particularly limited and includes cold-rolled steel, hot-rolled steel, mild steel, or high tensile steel, and also include iron-based base materials (iron-based metal materials), aluminum-based base materials (aluminum-based metal materials), zinc-based base materials (zinc-based metal materials), and magnesium-based base materials (magnesium-based metal materials). Iron-based base materials refer to base materials (metal materials) including iron and/or iron alloy, aluminum-based base materials refer to base materials (metal materials) including aluminum and/or aluminum alloy, and zinc-based base materials refer to base materials (metal materials) including zinc and/or zinc alloy. Magnesium-based base materials refer to base materials (metal materials) including magnesium and/or magnesium alloy.

When surface treating the above base materials other than an iron-based base material using the metal surface treatment composition containing a zirconium compound and/or titanium compound, there is not a large difference in the corrosion resistance and adhesiveness to the coating film of the formed coating film between a metal surface treatment composition substantially including fluorine and a metal surface treatment composition substantially not including fluorine and either one is favorable. On the other hand, when surface treating an iron-based metal, in the point of corrosion resistance of the formed coating film, both the case of substantially including fluorine and the case of substantially not including fluorine are good and show no difference between them, but in the point of adhesiveness to the coating film, a metal surface treatment composition substantially not including fluorine can have an improved adhesiveness to the coating film. Namely, in the above base material, when carrying out a surface treatment of a iron-based base material, the metal surface treatment composition containing a zirconium compound and/or titanium compound substantially not including fluorine of the present embodiment is useful as an iron-based metal surface treatment composition.

Furthermore, the metal surface treatment method according to the present embodiment may be simultaneously applied to a metal material including a plurality of metal base materials, such as iron-based base materials, aluminum-based base materials, and zinc-based base materials. Automobile bodies and automobile parts are constituted of various metal materials such as iron, zinc, aluminum and the like, but according to the metal surface treatment method according to the present embodiment, a satisfactory surface treatment can be carried out with a single treatment even for such automobile bodies and automobile body parts.

Iron-based base materials used as a metal material according to the present embodiment are not particularly limited, and examples thereof include cold-rolled steel and hot-rolled steel. The aluminum-based base materials are also not particularly limited, and examples thereof include 5000 series aluminum alloy, 6000 series aluminum alloy, and aluminum-coated steel plates treated by aluminum-based electroplating, hot dipping, or vapor deposition plating. Zinc-based base materials are also not particularly limited, and examples thereof include zinc or zinc-based alloy coated steel plates treated by zinc-based electroplating, hot dipping, or vapor deposition plating, such as zinc coated steel plate, zinc-nickel coated steel plate, zinc-iron coated steel plate, zinc-chromium coated steel plate, zinc-aluminum coated steel plate, zinc-titanium coated steel plate, zinc-magnesium coated steel plate, and zinc-manganese coated steel plate. High tensile steel plates are available in various grades depending on strength and manufacturing process, and examples thereof include JSC440J, 440P, 440W, 590R, 590T, 590Y, 780T, 780Y, 980Y, and 1180Y.

Amount of Surface Treatment Film

In order to increase the corrosion resistance of iron-based metal materials such as cold-rolled steel sheets, hot-rolled steel sheets, cast iron, sintered materials, and the like, and to form a uniform surface treatment coating film, and obtain satisfactory adhesiveness, if the surface treatment coating layer formed on an iron-based metal material surface contains at least 10 $mg/m^2$ of zirconium element and/or titanium element, it is preferable for the mass ratio of the zirconium element and/or titanium element with respect to the nitrogen element as analyzed by XPS of the surface treatment coating layer to be 0.05 to 500.

Further, in order to increase the corrosion resistance of zinc-based metal materials such as zinc or galvanized steel sheets, alloy hot dip galvanized steel sheets and the like, and to form a uniform chemical conversion coating film, and obtain a satisfactory adhesiveness, if the surface treatment coating layer formed on a zinc-based metal material surface contains at least 10 $mg/m^2$ of zirconium element and/or titanium element, it is preferable for the zirconium element and/or titanium element mass ratio with respect to the nitrogen element as analyzed by XPS of the surface treatment coating layer to be 0.05 to 500.

Further, in order to increase the corrosion resistance of aluminum-based metal materials such as cast aluminum, aluminum alloy sheets and the like, to form a uniform chemical conversion coating film, and obtain a satisfactory adhesiveness, if the surface treatment coating layer formed on an aluminum-based metal material surface contains 5 $mg/m^2$ or more of zirconium element and/or titanium element, it is preferable for the zirconium element and/or titanium element mass ratio with respect to the nitrogen element as analyzed by XPS of the surface treatment coating layer to be 0.05 to 500.

Further, in order to increase the corrosion resistance of magnesium-based metal materials such as magnesium alloy sheets, cast magnesium and the like, and to form a uniform chemical conversion coating film, and obtain a satisfactory adhesiveness, if the surface treatment coating layer formed on a magnesium-based metal material surface contains at least 5 $mg/m^2$ of zirconium element and/or titanium element, it is preferable for the zirconium element and/or titanium element mass ratio with respect to the nitrogen element as analyzed by XPS of the surface treatment coating layer to be 0.05 to 500.

For any of the metal material, there is no particular upper limit for the amount of the surface treatment coating layer, but if the amount is excessive, the surface treatment coating layer tends to cause cracking, which makes difficult the operation of forming a uniform film. Accordingly, the amount of the surface treatment film formed by the metal surface treatment method of the present embodiment preferably is 1 $g/m^2$ or less, more preferably is 800 $mg/m^2$ or less of zirconium and/or titanium with respect to the metal element.

Pretreatment of Metal Material

The metal material according to the present embodiment is preferably a metal material which has been cleansed by degreasing treatment. After the degreasing treatment, the metal material of the present embodiment is preferably subjected to water washing treatment. The degreasing treatment and water washing treatment are conducted for removing oil and stains from the surface of the metal material. In usual cases, immersion treatment is conducted for several minutes at a temperature from 30° C. to 55° C. using a degreasing agent such as a phosphate-free and nitrogen-free degreasing detergent. If desired, preliminary degreasing treatment may be conducted before the degreasing treatment. Furthermore, for removing the degreasing agent, water washing treatment is conducted after the degreasing treatment at least once by spray treatment with a large amount of washing water.

As described above, in the case where the metal surface treatment composition includes the surfactant, a favorable film is formed with no necessity of degreasing and cleansing of the metal material in advance. More specifically, in such a case, degreasing treatment of the metal material is simultaneously achieved in the treatment solution contact step.

Aftertreatment of Metal Material

A metal material having formed thereon a chemical conversion coating film by the metal surface treatment method according to the present embodiment is preferably subjected to water washing treatment before the subsequent formation of a coating film. More specifically, the metal surface treatment method according to the present embodiment includes a treatment solution contact step of contacting a metal surface treatment solution containing the metal surface treatment composition with the metal material, and a water washing step of washing the metal material with water after the treatment solution contact step. Impurities on the surface of the chemical conversion coating film are removed by the water washing treatment before the formation of a coating film, which further improves the adhesiveness to a coating film to offer favorable corrosion resistance.

If the chemical conversion coating film formed by the metal surface treatment method according to the present embodiment incorporates a polyamine compound, a blocked isocyanate having at least 2 blocked isocyanates in one molecule, or an organopolysiloxane having at least 2 amino groups in one molecule, then is it possible to carry out a water washing treatment before the coating film formation. Namely, if the amine compounds are monomers, there is concern that they will be removed by the water washing treatment, whereas for a polyamine compound which is a polymer, there is a strong interaction with hydroxides or oxides of zirconium and/or titanium which form the chemical conversion coating film, thus there is no such concern. Accordingly, the chemical conversion coating film formed by the metal surface treatment method according to the present embodiment will not lose its adhesiveness by water washing treatment.

In the water washing treatment after the surface treatment, the final water washing is preferably conducted with pure water. The water washing treatment after the surface treatment may be spray water washing, immersion water washing, or a combination thereof.

Following the water washing treatment after the surface treatment, drying may be conducted as necessary in accordance with a known method, but in the case where a chemical conversion coating film is formed by the metal surface treatment method according to the present embodiment, the film may be coated after water washing treatment with no necessity for drying treatment. More specifically, the formation of a chemical conversion coating film by the metal surface treatment method according to the present embodiment could be followed by coating by a wet and wet coating method. Accordingly, the metal surface treatment method according to the present embodiment allows for the reduction of the surface treatment process for metal materials before electro-deposition coating, such as an automobile body, body shell of a two-wheel vehicle or the like, various parts, and the like before electro-deposition coating.

Subsequently Formed Coating Film

Following the formation of a chemical conversion coating film by the metal surface treatment method according to the present embodiment, a coating film is formed on the chemical conversion coating film, and examples thereof include coating films formed by conventionally known paints such as an electro-deposition paint, solvent paint, aqueous paint, and powder paint.

Among these paints, electro-deposition paint, particularly cationic electro-deposition paint, is preferable for forming a coating film. The reason is that the cationic electro-deposition paint usually includes a resin having a functional group which exhibits reactivity or compatibility with amino groups, and hence, it acts on the polyamine compound having amino groups contained in the metal surface treatment composition as a chemical conversion treatment agent to further improve the adhesiveness between the electro-deposition coating film and the chemical conversion coating film. The cation electro-deposition paint is not particularly limited, and examples thereof include known cationic electro-deposition paints such as an aminated epoxy resin, aminated acrylic resin, and sulfonated epoxy resin.

Following the water washing step of washing the metal material with water after the treatment solution contact step of contacting the metal surface treatment solution containing the metal surface treatment composition according to the present embodiment, or following electrolytic treatment by contact, the metal material may be contacted with an acidic aqueous solution containing at least one selected from the group consisting of cobalt, nickel, tin, copper, titanium, and zirconium. More specifically, the metal surface treatment method according to the present embodiment may include, following the water washing step of washing with water the metal material after the treatment solution contact step, an acid contact step of contacting the metal material with an acidic aqueous solution containing at least one selected from the group consisting of cobalt, nickel, tin, copper, titanium, and zirconium. This further improves the corrosion resistance.

The supply source of at least one metal element selected from the group consisting of cobalt, nickel, tin, copper, titanium and zirconium is not particularly limited. Preferable examples thereof include oxides, hydroxides, chlorides, nitrates, oxynitrates, sulfates, oxysulfates, carbonates, oxycarbonates, phosphates, oxyphosphates, oxalates, oxyoxalates, and organic metal compounds of the metal elements which are readily available.

The acidic aqueous solution containing the metal elements preferably has a pH of 2 to 6. The pH of the acidic aqueous solution may be adjusted with an acid such as phosphoric acid, nitric acid, sulfuric acid, hydrofluoric acid, hydrochloric acid, and organic acid, and alkali such as sodium hydroxide, potassium hydroxide, lithium hydroxide, alkali metal salt, ammonia, ammonium salt, and amine.

Following the water washing step of washing the metal material with water after the treatment solution contact step of contacting the metal surface treatment solution containing the metal surface treatment composition according to the present embodiment with the metal material, or following electrolytic treatment by contact, the metal material may be contacted with a polymer-containing solution which contains at least one of a water-soluble polymer compound and water-dispersible polymer compound. More specifically, the metal surface treatment method according to the present embodiment may include, following the water washing step of washing with water the metal material after the treatment solution contact step, a polymer-containing solution contact step of contacting the metal material with a polymer-containing solution which contains at least one of a water-soluble polymer compound and water-dispersible polymer compound. This further improves corrosion resistance.

The water-soluble polymer compound and water-dispersible polymer compound are not particularly limited, and examples thereof include polyvinyl alcohol, poly(meth)acrylic acid, copolymer of acrylic acid and methacrylic acid, copolymers of ethylene and acrylic monomer such as (meth)acrylic acid and (meth)acrylate, copolymer of ethylene and vinyl acetate, polyurethane, aminomodified phenolic resin, polyester resin, epoxy resin, tannin, tannic acid and its salts, and phytic acid.

EXAMPLES

The invention is further illustrated by the following Examples and Comparative Examples, but the invention should not be limited to them. The blending quantity represents parts by mass unless otherwise noted.

Example 1

A commercial cold-rolled steel sheet (SPC, Manufactured by Nippon Testpanel Co., Ltd., 70 mm×150 mm×0.8 mm) was prepared as a metal material.

Pretreatment of Metal Material Before Chemical Conversion Treatment (Degreasing Treatment)

Specifically, the metal material was subjected to degreasing treatment at 40° C. for two minutes using "SURF-CLEANER EC92" (manufactured by Nippon Paint Co., Ltd.) as an alkali degreasing treatment agent.

(Water Washing Treatment after Degreasing Treatment)

Following the degreasing treatment, the metal material was subjected to immersion washing in a water-washing bath, followed by spray washing with tap water for about 30 seconds.

Chemical Conversion Treatment

Before the surface treatment (chemical conversion treatment) of the metal material, a metal surface treatment composition was prepared. Specifically, as a polyamine compound having a primary and/or secondary amino group, PAA10C (polyallylamine, effective concentration 10%, manufactured by NittoBoseki Co., Ltd.) at 1 mass %, and as a compound having a functional group A and/or functional group B, KBM403 (3-glycidoxypropyl-trimethoxysilane, effective concentration 100%, manufactured by Shin-Etsu Chemical Co., Ltd.) were reacted at a mass ratio of 1:0.5, at a reaction temperature of 25° C., and reaction time of 60 min. Using this product (below referred to as PAA-epoxy reactant (1:0.5)), and as a zirconium, a zirconium nitrate (reagent), a metal surface treatment composition was prepared so that the zirconium concentration was 500 ppm, and the PAA-epoxy reactant (1:0.5) concentration was 200 ppm. This metal surface treatment composition was adjusted to pH 3.5 with a sodium hydroxide aqueous solution, to prepare a metal surface treatment solution. The metal surface treatment solution was adjusted to a temperature of 30° C., in which the metal material washed with water was immersed for 60 seconds.

Water Washing Treatment after Chemical Conversion Treatment

The metal material after the chemical conversion treatment was subjected to spray treatment with tap water for 30 seconds, and then subjected to spray treatment with ion-exchanged water for ten seconds. Next, a spraying treatment was carried out for 10 sec with ion exchanged water.

Drying Treatment

The metal material after the water washing treatment was dried in an electric drying oven at 80° C. for five minutes. The mass of the chemical conversion coating film (g/m2) was determined by measuring the content of Zr, Si, and C contained in the metal surface treatment composition using an "XRF1700" (X-ray fluorescence spectrometer manufactured by Shimadzu Corporation).

Electro-Deposition Coating

After the chemical conversion treatment and water washing treatment, the metal materials in a wet condition were each coated with "ELECTRODEPOSITION POWERNIX 110" (product name, manufactured by Nippon Paint Co., Ltd.), a cationic electro-deposition paint, to form an electro-deposition coating film. The dry film thickness after the electro-deposition coating was 20 μm. Subsequently, each metal material was washed with water, and baked at 170° C. for 20 minutes to obtain test plates.

Example 2

A test sheet was obtained by the same means as in Example 1, except that magnesium nitrate (reagent) was added to the metal surface treatment composition, and the metal surface treatment composition was prepared so that the concentration of the magnesium nitrate was 200 ppm.

Example 3

A test sheet was obtained by the same means as in Example 1, except that the metal surface treatment composition was prepared-so that the concentration of the above PAA-epoxy reactant (1:0.5) was not 200 ppm, but 500 ppm.

Example 4

Fifteen parts by mass of KBE903 (3-aminopropyltriethoxysilane, effective concentration 100%, manufactured by Shin-Etsu Chemical Co., Ltd.) was uniformly dropped from a dropping funnel over a period of 60 minutes into a solvent of 70 parts by mass of deionized water (solvent temperature: 25° C.), and then allowed to react at 25° C. for 24 hours in a nitrogen atmosphere to obtain a polycondensate of organosilane containing 30% of active ingredients (hereinafter referred to as KBE903-KBM603 cocondensate (1)). A test plate was obtained in the same manner as Example 1 except that the KBE903-KBM603 cocondensate (1) was used instead of the above PAA-epoxy reactant (1:0.5) to prepare the metal surface treatment composition.

Example 5

A test sheet was obtained by the same means as in Example 1, except that the metal surface treatment composition was prepared so that the above PAA10C was used instead of the above PAA-epoxy reactant (1:0.5), and the concentration of the above PAA10C was 200 ppm.

Example 6

A test sheet was obtained by the same means as in Example 1, except that the metal surface treatment composition was prepared so that the above PAA-epoxy reactant (1:0.5) was not added, and further, copper nitrate (reagent) was added so that the copper nitrate concentration was 200 ppm.

Example 7

A test sheet was obtained by the same means as in Example 1, except that the metal surface treatment composition was prepared so that the above PAA-epoxy reactant (1:0.5) was not added, and further, sodium nitrite (reagent) was added to the metal surface treatment composition so that the sodium nitrite concentration was 2000 ppm.

Example 8

A test sheet was obtained by the same means as in Example 1, except that the metal surface treatment composition was prepared so that a blocked isocyanate (Elastron BN-08, effective concentration 35%, manufactured by Dai-Ichi Kogyo Seiyaku Co. Ltd.) was used instead of the above PAA-epoxy reactant (1:0.5), and the concentration of the active ingredients was 200 ppm.

Example 9

A test sheet was obtained by the same means as in Example 1, except that as a zirconium, zirconium acetate (reagent) was used instead of zirconium nitrate (reagent).

Example 10

A test sheet was obtained by the same means as in Example 1, except that the metal surface treatment composition was prepared so that RESITOP PL4012 (phenolic resin, manufactured by Gun Ei Chemical Industry Co., Ltd.) was added to the metal surface treatment composition so that the concentration of the phenolic resin was 200 ppm.

Example 11

A test sheet was obtained by the same means as in Example 1, except that the metal surface treatment composition was prepared so that the above above KBE903-KBM603 cocondensate produced in Example 4 was used instead of the above PAA-epoxy reactant (1:0.5), and further, zirconium fluoride (reagent) was used instead of the above zirconyl sulfate, and the concentration of zirconium fluoride was 50 ppm.

Example 12

A test sheet was obtained by the same means as in Example 1, except that the metal surface treatment composition was prepared without using the above PAA-epoxy reactant (1:0.5).

Example 13

A test sheet was obtained by the same means as in Example 1, except that electrolytic treatment was conducted for 10 minutes instead of the immersion treatment.

Example 14

A test sheet was obtained in the same manner as Example 1 except that a high tensile steel sheet (70 mm×150 mm×0.8 mm) was used as the metal material in place of the above SPC.

Example 15

A test sheet was obtained in the same manner as Example 1 except that an aluminum sheet (70 mm×150 mm×0.8 mm) was used as the metal material in place of the above SPC.

Comparative Example 1

A test sheet was obtained by the same means as in Example 1, except that the above PAA-epoxy reactant (1:0.5) produced in Example 1 was not added, and zircon fluoride (reagent) was used instead of the above zirconyl sulfate so that the concentration of zirconium was 200 ppm.

Comparative Example 2

A test sheet was obtained by the same means as in Example 1, except that the above PAA-epoxy reactant (1:0.5) produced in Example 1 was not added, and zircon fluoride (reagent) was used instead of the above zirconyl sulfate, and the concentration of zirconium was 200 ppm, and further, magnesium nitrate (reagent) was added so that the concentration of magnesium nitrate was 200 ppm.

Comparative Example 3

A test sheet was obtained by the same means as in Example 1, except that the above PAA-epoxy reactant (1:0.5) produced in Example 1 was not added, and zircon fluoride (reagent) was used instead of the above zirconyl sulfate, and the concentration of zirconium was 200 ppm, and further, sodium nitrite (reagent) was added so that the concentration of magnesium nitrate was 200 ppm.

Comparative Example 4

A test sheet was obtained by the same means as in Example 1, except that KBM903 (3-aminopropyltrimethoxysilane, effective concentration 100%, manufactured by Shin-Etsu Chemical Co., Ltd.) was used instead of the above PAA-epoxy reactant (1:0.5) produced in Example 1, and further, zircon fluoride (reagent) was used instead of the above zirconyl sulfate, and the concentration of zirconium was 200 ppm.

Comparative Example 5

A test sheet was obtained by the same means as in Example 1, except that KBM403 (3-glycidoxypropyltrimethoxysilane, effective concentration 100%, manufactured by Shin-Etsu Chemical Co., Ltd.) at 30 mass % was reacted, in water as a solvent, at a reaction temperature of 25° C. and a reaction time of 24 hrs, and this product (KBM403 monocondensate) was used instead of the above PAA-epoxy reactant (1:0.5) produced in Example 1, and further, zircon fluoride (reagent) was used instead of the above zirconyl sulfate, and the concentration of zirconium was 200 ppm.

Comparative Example 6

A test sheet was obtained by the same means as in Example 1, except that the above PAA-epoxy reactant (1:0.5) produced in Example 1 was not added, and zircon fluoride (reagent) was used instead of the above zirconyl sulfate, and the concentration of zirconium was 200 ppm, and further, RESITOP PL4012 (aminomodified phenolic resin, manufactured by Gun Ei Chemical Industry Co., Ltd.) so that the concentration of the aminomodified phenolic resin was 200 ppm.

Comparative Example 7

A test sheet was obtained by the same means as in Example 1, except that the above PAA10C was used instead of the above PAA-epoxy reactant (1:0.5) produced in Example 1, and further, zircon fluoride (reagent) was used instead of the above zirconyl sulfate, and the concentration of zirconium was 200 ppm.

Comparative Example 8

A test sheet was obtained in the same manner as Example 1 except that the chemical conversion treatment was replaced with the zinc phosphate treatment as described below.

Zinc Phosphate Treatment

The above SPC was prepared as a metal material, and the metal material after the degreasing treatment and water washing treatment was subjected to surface adjustment by immersion in 0.3% SURFFINE GL1 (surface adjusting agent manufactured by Nippon Paint Co., Ltd.) for 30 seconds at room temperature. Then, immersion treatment was executed using SURFDINE SD-6350 (zinc phosphate based chemical conversion treatment agent manufactured by Nippon Paint Co., Ltd.), at 42° C. for 2 min.

Comparative Example 9

A test plate was obtained in the same manner as Comparative Example 8, except that a high tensile steel sheet (70 mm×150 mm×0.8 mm) was used as the metal material in place of the SPC.

Comparative Example 10

A test plate was obtained in the same manner as Comparative Example 1 except that an aluminum sheet (70 mm×150 mm×0.8 mm) was used as the metal material in place of the above SPC.

Tests

Secondary Adhesiveness Test (SDT)

Two longitudinally parallel cuts reaching the base metal were made in the steel plates obtained in the Examples and Comparative Examples, and these were immersed in a 5 mass % NaCl solution at 50° C. for 480 hours. Next, after washing with water and drying, adhesive tape ("L-Pack LP-24" (product name) manufactured by Nichiban Co., Ltd.) was adhered to the cut portions, and further the tape was abruptly detached. The maximum width of the paint adhered to the removed adhesive tape was measured. The results are shown in Tables 1 and 2.

TABLE 1

| | Metal Material | Zr (ppm) | pH | Polyamine (ppm) |
|---|---|---|---|---|
| Example 1 | SPC | zirconyl nitrate (500) | 3.5 | PAA-epoxy reactant (200) |
| Example 2 | SPC | zirconyl nitrate (500) | 3.5 | PAA-epoxy reactant (200) |
| Example 3 | SPC | zirconyl nitrate (500) | 3.5 | PAA-epoxy reactant (500) |
| Example 4 | SPC | zirconyl nitrate (500) | 3.5 | KBE903/KBM603 cocondensate (1:1 200) |
| Example 5 | SPC | zirconyl nitrate (500) | 3.5 | PAA (200) |
| Example 6 | SPC | zirconyl nitrate (500) | 3.5 | — |
| Example 7 | SPC | zirconyl nitrate (500) | 3.5 | — |
| Example 8 | SPC | zirconyl nitrate (500) | 3.5 | block isocyanate (200) |
| Example 9 | SPC | zirconyl acetate (500) | 3.5 | PAA-epoxy reactant (200) |
| Example 10 | SPC | zirconyl nitrate (500) | 3.5 | — |
| Example 11 | SPC | zirconyl nitrate (500) | 3.5 | KBE903/KBM603 cocondensate (1:1 200) |
| Example 12 | SPC | zirconyl nitrate (500) | 3.5 | — |
| Example 13 | SPC | zirconyl nitrate (500) | 3.5 | PAA-epoxy reactant (200) |
| Example 14 | high-tensile steel sheet | zirconyl nitrate (500) | 3.5 | PAA-epoxy reactant (200) |
| Example 15 | Al | zirconyl nitrate (500) | 3.5 | PAA-epoxy reactant (200) |

| | Reaction Conditions (Added mass ratio) | Other Additives (ppm) | Treatment Time (sec) | Notes |
|---|---|---|---|---|
| Example 1 | 1% 25° C. × 60 min (1:0.5) | — | 60 | — |
| Example 2 | 1% 25° C. × 60 min (1:0.5) | Mg nitrate (200) | 60 | Mg nitrate |
| Example 3 | 1% 25° C. × 60 min (1:0.5) | — | 60 | PAA amount |
| Example 4 | 30% 25° C. × 24 h (water/ethanol 1:1) | — | 60 | aminosilane |
| Example 5 | — | — | 60 | PAA |
| Example 6 | — | Cu nitrate (200) | 60 | Cu nitrate |
| Example 7 | — | Na nitrite (2000) | 60 | oxidant |
| Example 8 | — | — | 60 | BI |
| Example 9 | 1% 25° C. × 60 min (1:0.5) | — | 60 | zirconyl acetate |
| Example 10 | — | phenolic resin (200) | 60 | zirconyl sulfate phenolic resin |
| Example 11 | 30% 25° C. × 24 h (water/ethanol 1:1) | zirconium fluoride (50) | 60 | aminosilane + zircon fluoride |
| Example 12 | — | — | 60 | Zr nitrate only |
| Example 13 | 1% 25° C. × 60 min (1:0.5) | — | 10 | electrodeposition treatment |
| Example 14 | 1% 25° C. × 60 min (1:0.5) | — | 60 | — |
| Example 15 | 1% 25° C. × 60 min (1:0.5) | — | 60 | — |

| | Amount of SPC Coating Film (mg/m$^2$) | | | SDT Detached Width (mm) | |
|---|---|---|---|---|---|
| | Zr | Si | C | Surface | Edge |
| Example 1 | 60 | — | 6.1 | 0.1 | — |
| Example 2 | 58 | — | 5.8 | — | — |
| Example 3 | 31 | — | 3.2 | 0.2 | 0.8 |
| Example 4 | 29 | 2.4 | 3.1 | 0.8 | 1.2 |
| Example 5 | 55 | — | 5.4 | 0.6 | 1.8 |
| Example 6 | 52 | — | — | 1.0 | 1.8 |
| Example 7 | 45 | — | — | 1.2 | 1.6 |
| Example 8 | 45 | — | 2.6 | 0.2 | 0.4 |
| Example 9 | 36 | — | 3.1 | 0.4 | 1.2 |
| Example 10 | 38 | — | 2.3 | 1.0 | 1.0 |
| Example 11 | 35 | 2.5 | 2.6 | — | — |
| Example 12 | 41 | — | — | 1.8 | 1.5 |
| Example 13 | 27 | — | 2.8 | — | — |
| Example 14 | 68 | — | 7.2 | 0.6 | 0.2 |
| Example 15 | 40 | — | 4.2 | 0.5 | 0.2 |

TABLE 2

| | Metal Material | Zr (ppm) | pH | Polyamine (ppm) |
|---|---|---|---|---|
| Comparative Example 1 | SPC | Zr fluoride (200) | 3.5 | — |
| Comparative Example 2 | SPC | Zr fluoride (200) | 3.5 | — |
| Comparative Example 3 | SPC | Zr fluoride (200) | 3.5 | — |
| Comparative Example 4 | SPC | Zr fluoride (200) | 3.5 | KBM903 (200) |
| Comparative Example 5 | SPC | Zr fluoride (200) | 3.5 | KBM403 monocondensate (200) |
| Comparative Example 6 | SPC | Zr fluoride (200) | 3.5 | — |
| Comparative Example 7 | SPC | Zr fluoride (200) | 3.5 | PAA10C (200) |

TABLE 2-continued

| | | | |
|---|---|---|---|
| Comparative Example 8 | SPC | | 0.3% SURFFINE GL1/SURFDINE SD-6350 (zinc phosphate) |
| Comparative Example 9 | high-tensile steel sheet | | 0.3% SURFFINE GL1/SURFDINE SD-6350 (zinc phosphate) |
| Comparative Example 10 | Al | Zr fluoride (200) | 3.5 — |

| | Reaction Conditions (Added mass ratio) | Other Additives (ppm) | Treatment Time (sec) | Notes |
|---|---|---|---|---|
| Comparative Example 1 | — | — | 60 | Zr only |
| Comparative Example 2 | — | magnesium nitrate (200) | 60 | Zr + added metal |
| Comparative Example 3 | — | sodium nitrite (2000) | 60 | Zr + oxidizing agent |
| Comparative Example 4 | none | — | 60 | Zr + aminosilane monomer |
| Comparative Example 5 | 30% 25° C. × 24 h (water) | — | — | epoxy silane |
| Comparative Example 6 | — | amino modified phenolic resin (200) | 60 | Zr + adhesive resin |
| Comparative Example 7 | — | 60 | Zr + PAA | 52 |
| Comparative Example 8 | 0.3% SURFFINE GL1/SURFDINE SD-6350 (zinc phosphate) | | 120 | zinc phosphate |
| Comparative Example 9 | 0.3% SURFFINE GL1/SURFDINE SD-6350 (zinc phosphate) | | 120 | zinc phosphate |
| Comparative Example 10 | — | — | 60 | Zr only |

| | Amount of SPC Coating Film (mg/m²) | | | SDT Detached Width (mm) | |
|---|---|---|---|---|---|
| | Zr | Si | C | Surface | Edge |
| Comparative Example 1 | 38 | — | — | 5.1 | 5.2 |
| Comparative Example 2 | — | — | — | 3.9 | 3.7 |
| Comparative Example 3 | — | — | — | 3.9 | 3.9 |
| Comparative Example 4 | 38 | 1.1 | 1.3 | 3.5 | 3.4 |
| Comparative Example 5 | 42 | 0.2 | 0.3 | 4.5 | 4.6 |
| Comparative Example 6 | 35 | — | 5.2 | 4.7 | 4.3 |
| Comparative Example 7 | 52 | — | 13.0 | ? | ? |
| Comparative Example 8 | | 1.6 mg/m² | | 1.7 | 1.4 |
| Comparative Example 9 | | 1.7 mg/m² | | 2.6 | 2.8 |
| Comparative Example 10 | 66 | — | — | — | — |

As shown in Table 1 and Table 2, regardless of whether the metal material is SPC or a high-tensile steel sheet, when chemical conversion treatment is carried out using a metal surface treatment composition containing zirconyl nitrate, which is a compound substantially not including fluorine; or zirconyl nitrate which is a compound substantially not including fluorine, and a PAA-epoxy reactant (1:0.5), a KBE903-KBM603 cocondensate, or a blocked isocyanate, the removal of paint was relatively little, and the amount of the coating film was also sufficiently large whereby sufficient base metal concealing properties, coating film adhesiveness, and corrosion resistance could be obtained. Further, these results can be understood to be superior to the case of the Comparative Examples which carry out the chemical conversion treatment using a metal surface treatment composition containing a zirconyl fluoride including a fluorine, and not containing a PAA-epoxy reactant (1:0.5), a KBE903-KBM603 cocondensate or the like.

INDUSTRIAL APPLICABILITY

The metal material treated by the metal surface treatment method of the invention has sufficient base metal concealing properties, coating film adhesiveness, and corrosion resistance. Therefore, it is preferably used for applications followed by coating treatment, such as an automobile body before coating, body shell of a two-wheel vehicle or the like, various parts, outer surface of a container, and coil coating.

The invention claimed is:
1. A metal surface treatment composition used for surface treatment of a metal, containing
   at least one selected from the group consisting of a zirconium compound and a titanium compound substantially not including fluorine,
   at least one selected from the group consisting of an inorganic acid and a salt thereof, a polyamine compound having a number average molecular weight from 150 to 500,000, and wherein
the polyamine compound is an organosiloxane selected from one of the following Formulas (17) to (21):

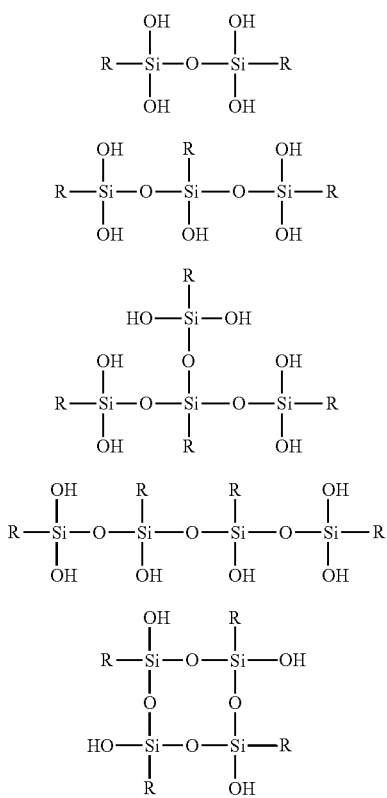

where R represents —$C_3H_6NHC_2H_4NH_2$, or —$C_3H_6NH_2$.

2. The metal surface treatment composition according to claim 1, wherein at least one selected from the group consisting of said zirconium compound and titanium compound is at least one selected from the group consisting of a nitrate, nitrite, sulphate, sulfite, acetate, and carbonate of at least one selected from the group consisting of zirconium and titanium.

3. The metal surface treatment composition according to claim 1, wherein said polyamine compound contains from 0.1 mmol to 24 mmol of at least one selected from the group consisting of a primary and secondary amino group per 1 g of solid content.

4. The metal surface treatment composition according to claim 1, wherein said polyamine compound is a product produced by a reaction of at least one selected from the group consisting of a primary and secondary amino group-containing compound, and an amine activity reducing compound A having a functional group A which has reactivity with at least one selected from the group consisting of said primary and secondary amino group.

5. The metal surface treatment composition according to claim 1, wherein said polyamine compound is a product produced by interaction of at least one selected from the group consisting of a primary and secondary amino group-containing compound, and an amine activity reducing compound B containing at least one functional group B which interacts with at least one selected from the group consisting of said primary and secondary amino group and reduces amine activity.

6. The metal surface treatment composition according to claim 1, further containing a blocked isocyanate having a number average molecular weight from 150 to 500,000, and further having at least two blocked isocyanate groups per molecule.

7. The metal surface treatment composition according to claim 1, wherein a content of at least one selected from the group consisting of zirconium compound and titanium compound in said metal surface treatment composition is from 10 ppm to 10,000 ppm with respect to the metal element.

8. The metal surface treatment composition according to claim 1, further containing at least one kind of metal element selected from the group consisting of magnesium, zinc, calcium, aluminum, gallium, indium, copper, iron, manganese, nickel, cobalt, cerium, strontium, rare earth elements, and silver.

9. The metal surface treatment composition according to claim 1, further containing at least one kind of surfactant selected from the group consisting of nonionic surfactants, anionic surfactants, cationic surfactants, and ampholytic surfactants.

* * * * *